(12) United States Patent
Kirschner et al.

(10) Patent No.: US 12,499,227 B2
(45) Date of Patent: Dec. 16, 2025

(54) TRACKING AND PREVENTION OF FAULT INJECTION ATTEMPT SEQUENCES USING THERMAL MEMORY

(71) Applicant: NUVOTON TECHNOLOGY CORPORATION, Hsin-chu (TW)

(72) Inventors: Yuval Kirschner, Even Yehuda (IL); Tamir Golan, Kibbutz Givaat-Chaim Meuchad (IL); Ziv Hershman, Givat Shmuel (IL)

(73) Assignee: Nuvoton Technology Corp., Hsinchu (TW)

( * ) Notice: Subject to any disclaimer, the term of this patent is extended or adjusted under 35 U.S.C. 154(b) by 150 days.

(21) Appl. No.: 18/427,908

(22) Filed: Jan. 31, 2024

(65) Prior Publication Data

US 2025/0245323 A1    Jul. 31, 2025

(51) Int. Cl.
*G06F 21/55* (2013.01)
(52) U.S. Cl.
CPC .......... *G06F 21/556* (2013.01); *G06F 21/554* (2013.01)
(58) Field of Classification Search
CPC ...... G06F 21/554; G06F 21/556; G06F 21/55; G06F 21/566; G06F 21/72
See application file for complete search history.

(56) References Cited

U.S. PATENT DOCUMENTS

| | | | | |
|---|---|---|---|---|
| 3,079,541 | A * | 2/1963 | Mccary | G05F 1/32 323/250 |
| 10,013,581 | B2 * | 7/2018 | Hershman | G06F 21/75 |
| 2005/0259496 | A1 * | 11/2005 | Hsu | G06F 13/16 365/226 |
| 2014/0020097 | A1 * | 1/2014 | Riou | G06F 21/554 726/22 |
| 2015/0135740 | A1 * | 5/2015 | Stannard | B60H 1/3201 62/177 |
| 2016/0098333 | A1 * | 4/2016 | Hershman | G06F 21/75 714/41 |
| 2020/0057138 | A1 * | 2/2020 | Bouchayer | G01K 15/007 |
| 2020/0211607 | A1 * | 7/2020 | Moisuc | G06F 21/77 |
| 2021/0194707 | A1 * | 6/2021 | Aronson | H04L 9/0861 |

(Continued)

OTHER PUBLICATIONS

Gomina et al., "Power Supply Glitch Attacks: Design and Evaluation of Detection Circuits," Proceedings of the 2014 IEEE International Symposium on Hardware-Oriented Security and Trust (HOST), pp. 136-141, May 2014.

(Continued)

*Primary Examiner* — Dao Q Ho
(74) *Attorney, Agent, or Firm* — Meitar Patents Ltd.; Daniel Kligler

(57) ABSTRACT

An integrated circuit (IC) includes a thermal memory device, a fault injection (FI) detector and a security control circuit. The thermal memory device includes (i) a thermal storage zone and (ii) a heating element configured to heat the thermal storage zone in response to write operations. The FI detector is configured to detect attempts to inject faults into the IC. The security control circuit is configured to perform a write operation to the thermal memory device in response to an attempt detected by the FI detector, to identify a sequence of the attempts that meets a density criterion, by reading the thermal memory device, and initiate a responsive action upon identifying the sequence.

12 Claims, 3 Drawing Sheets

(56) References Cited

U.S. PATENT DOCUMENTS

| | | | |
|---|---|---|---|
| 2021/0240823 A1* | 8/2021 | Margalit | G06F 21/556 |
| 2023/0129830 A1* | 4/2023 | Ghetie | G06F 21/74 |
| | | | 726/23 |
| 2023/0395181 A1* | 12/2023 | Rovelli | G11C 29/52 |
| 2024/0185938 A1* | 6/2024 | Izzo | G11C 29/12015 |

OTHER PUBLICATIONS

Nemiroff et al., "Fault-Injection Countermeasures, Deployed at Scale," White Paper, Intel Corporation, pp. 1-6, Aug. 2022.

* cited by examiner

TRACKING AND PREVENTION OF FAULT INJECTION ATTEMPT SEQUENCES USING THERMAL MEMORY

FIELD OF THE INVENTION

The present invention relates to security of integrated circuits, and particularly to methods and apparatuses to reliably register integrated circuit fault injection security attacks.

BACKGROUND OF THE INVENTION

Fault injection through a side channel is a family of techniques used to extract secrets from an integrated circuit. Example fault injection techniques include injection of spikes on the power supply input and applying magnetic or optical pulses to the circuit.

Various techniques for detecting fault injection attempts are known in the art. For example, U.S. Pat. No. 10,013,581 discloses an apparatus for detecting fault injection, including functional circuitry and fault detection circuitry. The functional circuitry is configured to receive one or more functional input signals and to process the functional input signals to produce one or more functional output signals. The functional circuitry meets a stability condition that specifies that stability of a designated set of one or more of the functional input signals during a first time-interval guarantees stability of a designated set of one or more of the functional output signals during a second time-interval that is derived from the first time-interval. The fault detection circuitry is configured to monitor the designated functional input and output signals, to evaluate the stability condition based on the monitored functional input and output signals, and to detect a fault injection attempt in response to detecting a deviation from the stability condition.

In an Intel White Paper titled "Fault-Injection Countermeasures, Deployed at Scale" (Intel reference 0822/DCC/MZ/PDF), by Nemiroff and Tokunaga (August 2022), the authors detail the design, calibration, and validation methodology for a fault injection detection circuit, and describe how fault-injection attacks can impact circuit timing, the high-level design of the Tunable Replica Circuit (TRC), data gathering phase that occurs in HVM (high volume manufacturing), the methodology to create a calibration recipe, false positive testing, fault-injection testing and the final HVM production calibration flow.

Lastly, in "Power supply glitch attacks: Design and evaluation of detection circuits", K. Gomina et. al., 2014 IEEE International Symposium on Hardware-Oriented Security and Trust (Held May 2014), 6-7 (DOI: 10.1109/HST.2014.6855584), the authors assert that techniques using modification of power supplies to attack circuits do not require strong expertise or expensive equipment and, hence, supply voltage glitches are a serious threat to the security of electronic devices. The paper then analyzes mechanisms involved during such attacks and shows that timing properties of logic gates are very sensitive to power glitches and can be used to inject faults. A new approach to validate power glitch detection circuits is presented, allowing the evaluation of the circuits using a standard digital design flow.

SUMMARY OF THE INVENTION

An embodiment of the present invention that is described herein provides an integrated circuit (IC) including a thermal memory device, a fault injection (FI) detector and a security control circuit. The thermal memory device includes (i) a thermal storage zone and (ii) a heating element configured to heat the thermal storage zone in response to write operations. The FI detector is configured to detect attempts to inject faults into the IC. The security control circuit is configured to perform a write operation to the thermal memory device in response to an attempt detected by the FI detector, to identify a sequence of the attempts that meets a density criterion, by reading the thermal memory device, and initiate a responsive action upon identifying the sequence.

In an embodiment, the thermal storage zone includes a thermal-storage bit. In another embodiment, the thermal storage zone includes one or more reference thermal storage bits that are not written. In a disclosed embodiment, the thermal memory includes at least two thermal-storage bits, and the security control circuit is configured to identify the sequence of the attempts responsively to detecting that at least a preset number of the thermal storage bits has been written.

In some embodiments, the thermal memory device includes one or more thermal storage bits, each thermal storage bit including a heating element, a temperature measurement element, and a thermal storage element. In an example embodiment, the temperature measurement element comprises a P—N diode. In an example embodiment, the thermal storage element includes a thermally isolated metal layer.

In a disclosed embodiment, the security control circuit is configured to sequentially: (i) further to a power-up sequence, check for a failed-boot attempt indication in which a first thermal storage bit has been written and a second thermal storage bit has not been written; (ii) responsively to detecting the failed-boot attempt indication, abort the boot; (iii) write to the first thermal storage bit; and (iv) responsively to a successful boot sequence, write to the second thermal storage bit. In some embodiments, the security control circuit is configured to identify the sequence of the attempts regardless of a reset event occurring in the IC during the sequence.

There is additionally provided, in accordance with an embodiment of the present invention, a method for securing an integrated circuit (IC). The method includes detecting attempts to inject faults into the IC, and, in response to detecting an attempt to inject a fault, performing a write operation to a thermal memory device, which includes (i) a thermal storage zone and (ii) a heating element configured to heat the thermal storage zone in response to write operations. A sequence of the attempts, which meets a density criterion, is identified by reading the thermal memory device. A responsive action is initiated identifying the sequence.

The present invention will be more fully understood from the following detailed description of the embodiments thereof, taken together with the drawings in which:

DETAILED DESCRIPTION OF EMBODIMENTS

Overview

Security attacks on integrated circuits (ICS) sometimes involve fault injection (FI) methods (e.g. magnetic pulse, light/laser pulse, or supply glitch) that cause incorrect functionality of some of the secure IC circuitry, which, in turn, may expose secrets (e.g., encryption or authentication keys) that are used by the secure IC.

Typically, an attacker has limited knowledge about the circuit and, therefore, the attacker may try various attack parameters, such as timing & duration of the pulse, location (e.g., where on the die the EM/laser/light pulse should be directed), strength of the pulse (not too strong and not to weak, to get the desired effect), etc. As a result, the attacker may have to run numerous iterations of the attack, with changing parameters (typically, an automatic tool is used to step through the varying parameters).

Secure ICs may contain FI detectors of varying designs, to detect attacks. FI detectors, however, may err, including false positive errors (e.g., interpretation of a normal spike as an FI), and false-negative (e.g., failure to detect an attack).

Responsively to a fault injection detection, the secure IC may take several possible courses of action. For example, the secure IC may permanently self-destruct (e.g., blow one or more on-IC fuses to permanently disconnect key nodes and/or erase or write all non-volatile storage bits); however, given that false positive errors are possible, such extreme course of action, which renders the secure IC useless, is often undesirable.

Other conventional courses of action temporarily block the attack, forcing the attacker to restart the secure IC and try another attack (e.g., after varying one or more attack parameters). However, since resetting of the secure IC may be done relatively quickly, the attacker may still execute attacks with varying parameters at a relatively high rate (using, for example, an automatic tool).

Embodiments f the present invention that are disclosed herein provide for attack detection handling techniques in a secure IC, using a fault injection (FI) detector circuit and a thermal memory device that is written responsively to fault injection detection. The thermal memory device comprises a thermal storage zone and a heating element that heats the thermal storage zone in response to write operations. The thermal memory device, thus, retains its storage during IC reset, considerably slowing down repeated fault injections, often rendering automatic fault injection with varying parameters ineffective. Embodiments that are disclosed herein include various thermal storage zone structures, and security enhancement methods that read the thermal memory to identify a sequence of the attempts that meets a density criterion.

SYSTEM DESCRIPTION

Figure 1:
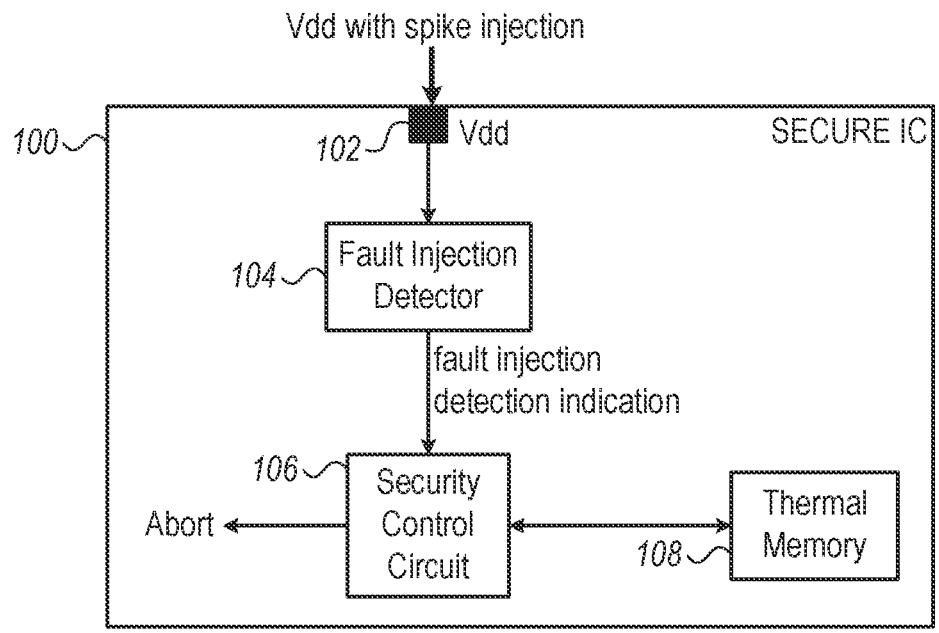
FIG. 1 is a block diagram that schematically illustrates a secure Integrated Circuit (IC), in accordance with an embodiment of the present invention.

FIG. 1 is a block diagram that schematically illustrates a secure Integrated Circuit (IC) 100, in accordance with an embodiment of the present invention. Secure IC 100 comprises a Vdd input pad 102, that is typically connected to a power supply (not shown) of the integrated circuit. According to the example embodiment illustrated in FIG. 1, attackers may attempt to gain access to sensitive functionality (e.g., to stored encryption keys) by injecting spikes onto the Vdd input. In other embodiments, other types of faults may be injected, e.g., radiation pulses.

Secure IC 100 further comprises a Fault Injection (FI) Detector circuit 104, a Security Control Circuit (referred to as SCC hereinbelow) 106, and a Thermal Memory device (also referred to, in short, as Thermal Memory) 108. In embodiments, Fault Injection Detector circuit 104 is configured to detect abnormal voltage levels of the Vdd input and/or abnormal rate-of-change of the Vdd input (other techniques for Vdd attack detection may be used in alternative embodiments). When detecting a fault injection attempt, the Fault Injection Detector sends a Fault-Injection-Detection indication to the SCC.

It should be noted that Fault-Injection Detection Indication includes detection of fault injection attempts as well as false positive indications. In embodiments, frequent Fault-Injection Detection Indications are assumed to be caused by an attacker, while infrequent Fault-Injection Detection Indications are typically ignored.

For shorter notation, we will refer below to Fault-Injection Detection Indications, including false-positive indications, as FI detection events.

Security-Control circuit 106 is configured to protect the secure IC against fault-injection attacks in a way that would allow only infrequent FI detection events, and yet protect against frequent fault injections, which may indicate a systematic attack with varying parameters. Towards that goal, the SCC writes and reads data to and from Thermal Memory 108, which is configured to retain written data according to thermal time constants (typically tens of seconds, or more) irrespective to the power supply of the secure IC (and, hence, over power-down periods). In embodiments, the thermal memory status identifies a FI-detection events density criterion, and the secure IC is configured to permanently disallow access to sensitive data if the criterion is met.

In some embodiments, the SCC is configured to, responsively to an FI detection event, (i) check if the thermal memory has been written; (ii) if the thermal memory has been written-permanently disable IC operations; or, if not, (iii) perform a write operation into the thermal memory.

In other embodiments, multiple thermal memory bits are used, allowing more than one false-positive fault in a short period (e.g., permanently disable the secure IC in case three fault injections are registered). In yet another embodiment (to be described below, with reference to FIG. 5) one thermal memory bit is written upon power up and a second thermal memory bit is written following successful secure IC boot; the SCC is configured to disable access to the secure IC in the event that the first bit is set, the second bit is not set, and a fault injection is detected.

In some embodiments, three thermal memory bits are used. The SCC writes a first bit at the beginning of the boot and a second bit at the end of a successful boot, or a third bit at the end of an unsuccessful boot. Thus, if an attacker detects that a write-thermal-memory-bit operation at the end of the boot and terminates the power supply to abort the operation, the SCC will still be able to tell a failed fault-injection attempt after the next power-up by examining the three bits.

THERMAL MEMORY STRUCTURES

In embodiments, thermal memory 108 comprises one or more thermal memory storage zones (also referred to as thermal memory cells), each cell comprising a heating element and a heat sensing circuit, that are coupled to an insulated thermally conducting substance. The heating element typically comprises a poly-silicon layer, a diffusion layer, a transistor, or a forward-biased diode. The heat sensing circuit is typically a forward-biased diode, coupled to a comparator that compares a voltage drop on the diode either to a fixed threshold voltage or to a voltage drop on a reference diode that is not heated. In some embodiments, the heating element comprises a diode, which may be used also as the heat sensing circuit.

The insulated thermally conducting substance typically comprises a metal layer (e.g., the Redistribution Layer or RDL), that is not connected to any other nodes in the secure IC (except for the heating element and the heat sensing circuit).

In various embodiments, thermal memory structures that comprise combinations of one or more thermal memory cells may be used (we will refer herein to the structure of a single-bit thermal memory).

In an embodiment, a simple thermal memory structure comprising a single thermal memory cell is used. The heat sensing circuit compares the voltage on the heat sensing diode to a fixed threshold, to determine whether the thermal memory is heated. As the secure IC may be at high ambient temperature, the threshold voltage should be set to a voltage above the voltage drop associated with the high ambient temperature. This may leave short margins, and, hence, the functionality of the single basic thermal memory structure is limited.

In other embodiments, differential thermal memory structures may be used, which mitigate the limited functionality of the single-cell thermal memory structure described above by comparing temperature sensing of a heated cell with that of an unheated cell.

Figure 2:
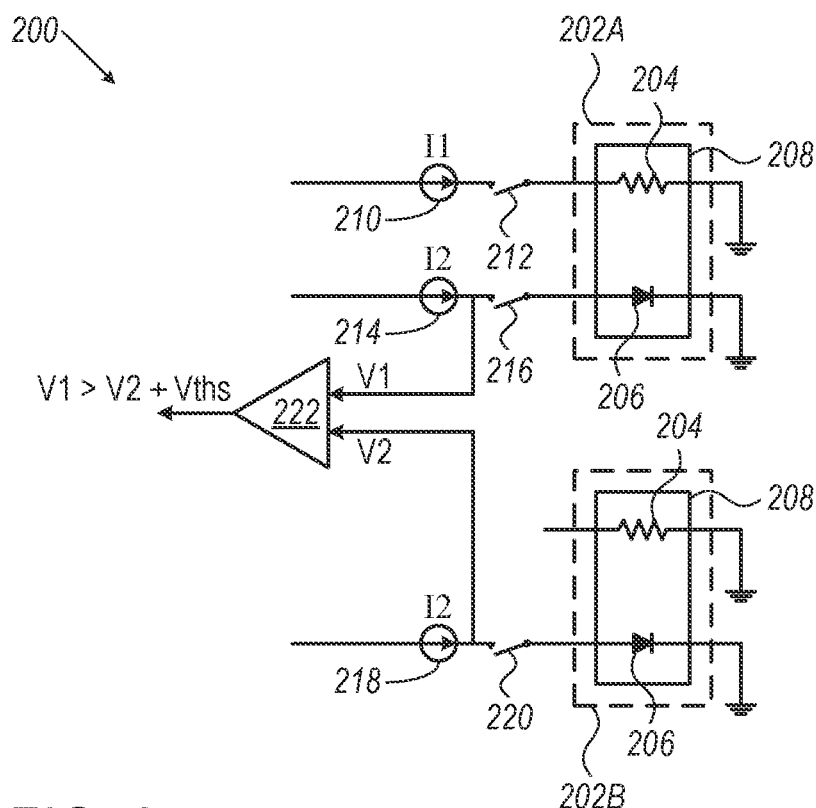
FIG. 2 is a block diagram that schematically illustrates a differential t in accordance with an embodiment of the present invention.

FIG. 2 is a block diagram that schematically illustrates a differential thermal memory 200, in accordance with an embodiment of the present invention. Differential thermal memory 200 comprises a data thermal memory cell 202A and a reference thermal memory cell 202B. Each of thermal memory cells 202A and 202B comprises a heating element 204, a heat-sensing diode 206 and an insulated thermal conducting substance 208.

To write data into thermal memory 200, a current source 210 sources a current I1 through a switch 212 to the heating element 204 of thermal memory cell 202A; the current is strong enough to significantly heat the insulated thermal conducting substance 208 of thermal memory cell 202A. heating element 204 of thermal memory cell 202B is not heated and remains at (or close to) the ambient temperature. In embodiments, thermal memory cells 202A and 202B are close to each other and subject to similar heating from other active elements of the secure IC. Moreover, in embodiments, the physical structure of the thermal memory cells is closely matched, the thermal coefficients also closely match, and the cells will cool (e.g., at IC turn off) at a similar rate. Hence, reading (e.g., determining if the thermal memory cell has been recently written into) can be done with high accuracy by comparing the temperatures of the heat-sensing diodes 208.

Differential thermal memory 200 further comprises a current source 214 that is configured to source a current I2 through a switch 216 to the heat sensing diode 206 of thermal memory cell 202A; and a current source 218 that is configured to source the same current I2 through a switch 220 to the heat sensing diode 206 of thermal memory cell 202B.

To determine if the memory has been written into, the thermal memory cell further comprises a comparator 222, that is configured to compare a voltage V1 on the heat sensing diode 206 of thermal memory cell 202A to a voltage V2 on the heat sensing diode 206 of thermal memory cell 202B.

Since, when thermal memory cell 202A has not been written, the voltage difference between V1 and V2 is small, comparator 222 is configured to compare V1 to V2+Vths, wherein Vths is a threshold voltage; ideally set to the half of the expected difference V1-V2 when thermal memory cell 202A has been written. In an alternative embodiment, Vths is not added to V2; instead, current source 218 sources more current than current source 214.

Thus, in embodiments, reliable reading of a thermal memory can be achieved when comparing the temperature sensing of heated thermal memory cell to the temperature sensing of an unheated cell.

The configuration of differential thermal memory 200 illustrated in FIG. 2 and described hereinabove is cited by way of example. Other configurations may be used in alternative embodiments. For example, in an embodiment, heating element 204 of thermal memory cell 202B (which is added for better heat coefficient matching) may not be used. In some embodiments, a single I2 current is used; switches 216 and 220 are configured to alternately switch the single I2 current source to the two heat sensing diodes 206, and comparator 222 is configured to compare successive diode-voltage samples (e.g., using a sample-and-hold circuit). In yet other embodiments, an analog to digital converter (ADC) converts the voltages on the heat sensing diodes to digital signals, and the control circuit digitally determines if the thermal memory has been written.

Figure 3:
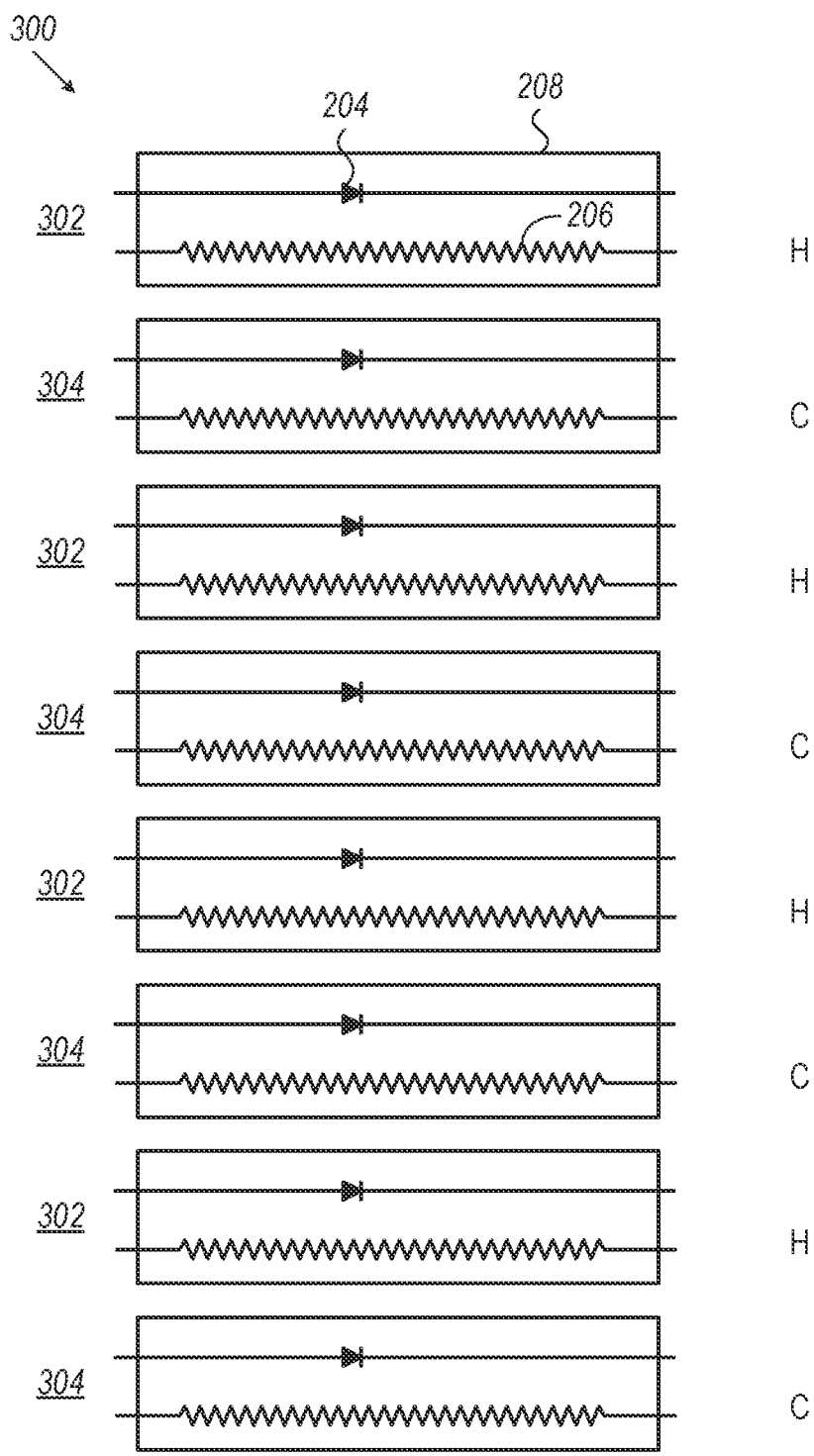
FIG. 3 block diagram that schematically illustrates a multi-cell differential thermal memory, in accordance with an embodiment of the present invention.

FIG. 3 is a block diagram that schematically illustrates a multi-cell differential thermal memory 300, in accordance with an embodiment of the present invention. The purpose of a multi-cell thermal memory is to improve the accuracy of the detection, allowing for ambient temperature variance within the secure IC.

Multi-cell differential thermal memory 300 comprises a plurality of programmable thermal memory cells 302, interleaved with a plurality of non-programmed reference thermal memory cells 304. All cells are positioned in proximity to each other. A Programmed (heated) state can be detected, for example, if the heat sensing diodes of each of the 302 cells output a voltage that is higher than the voltages of the sensing diodes of its two neighbor 304 cells. In another embodiment the heat sensing diodes of most of the 30 cells should be higher than the voltages of the diodes of the neighbor 304 cells. In yet another embodiment, the voltages of all heat sensing diodes are analog-to-digital converted, and a heated state is determined according to a digital processing of the voltages, which may optimize the expected false-negative and false-positive rates.

Figure 4:
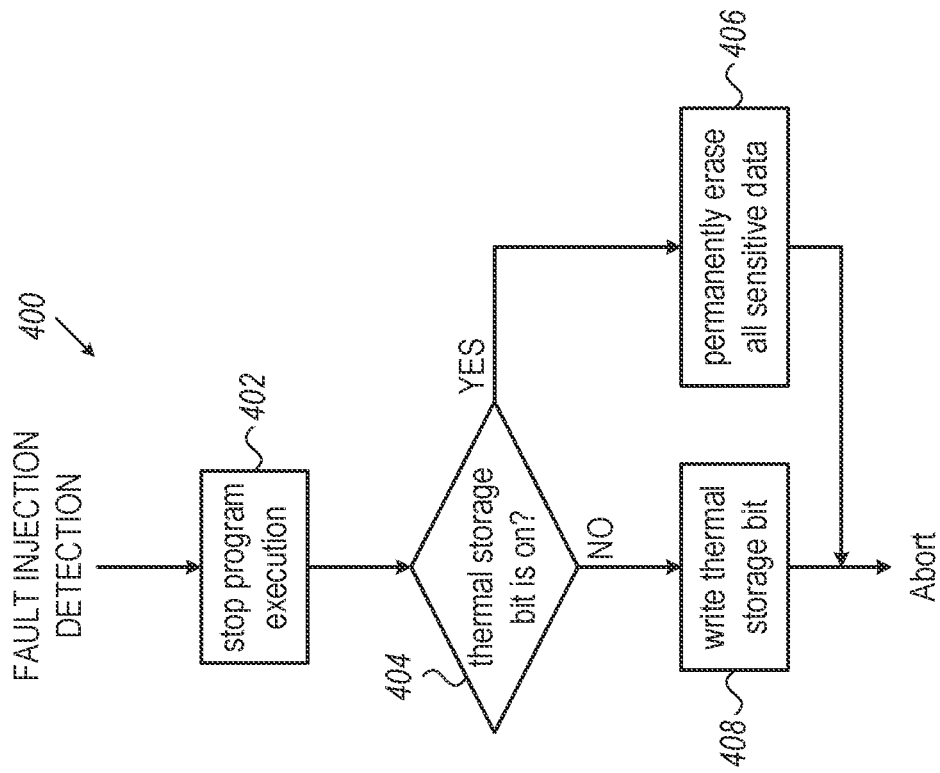
FIG. 4 is a flowchart that schematically illustrates a method for protecting a secure processor IC against repetitive side channel attacks using a single-bit thermal memory, in accordance with an embodiment of the present invention.

Protection Against Sequences of Fault Injection Attempts Using Thermal Memory FIG. 4 is a flowchart 400 that schematically illustrates a method for protecting a secure processor against repetitive side channel attacks using a single-bit thermal memory, in accordance with an embodiment of the present invention.

The flowchart is triggered responsively to a fault injection detection (indicated by fault injection detection circuit 104, FIG. 1), and executed by SCC 106 (FIG. 1). The flowchart starts at a Stop Program Execution operation 402, wherein the SCC stops program execution, to protect any on-IC sensitive data. Next, at a check thermal-storage-bit operation 404, the SCC reads the thermal memory 108 (FIG. 1) to determine if a previous fault injection has been recently detected (or, more accurately, that the time since the last fault injection detection is shorter than the time it takes for the thermal memory to lose its contents). If so, the SCC enters a Permanent-Erase operation 406, wherein the SCC permanently protects all secure IC sensitive data; in some embodiments the SCC may initiate an Erase of an on-IC flash memory; in other embodiments, the SCC may initiate the blowing (disconnecting) of on-IC fuses, to disable accesses to the secure IC. The flowchart then ends, and the program execution aborts.

If, in operation 404, the thermal storage bit is not on (and, hence, this fault injection is a first in a relatively long time, and may be a false-positive error), the SCC enters a Write-Thermal-Storage Bit operation 408 and writes the thermal storage bit, to indicate a fault injection detection. The flowchart then ends, and the program execution aborts.

In some embodiments, the secure IC comprises a processor that is sensitive to attacks during boot (e.g., the processor may load sensitive keys from Flash to RAM during boot, and, thus, execution past the Boot phase is considered safe). In those embodiments, however, the boot period must be protected; in particular, an attacker may cycle between reset and boot at a high speed, successively injecting faults with varying parameters.

Figure 5:
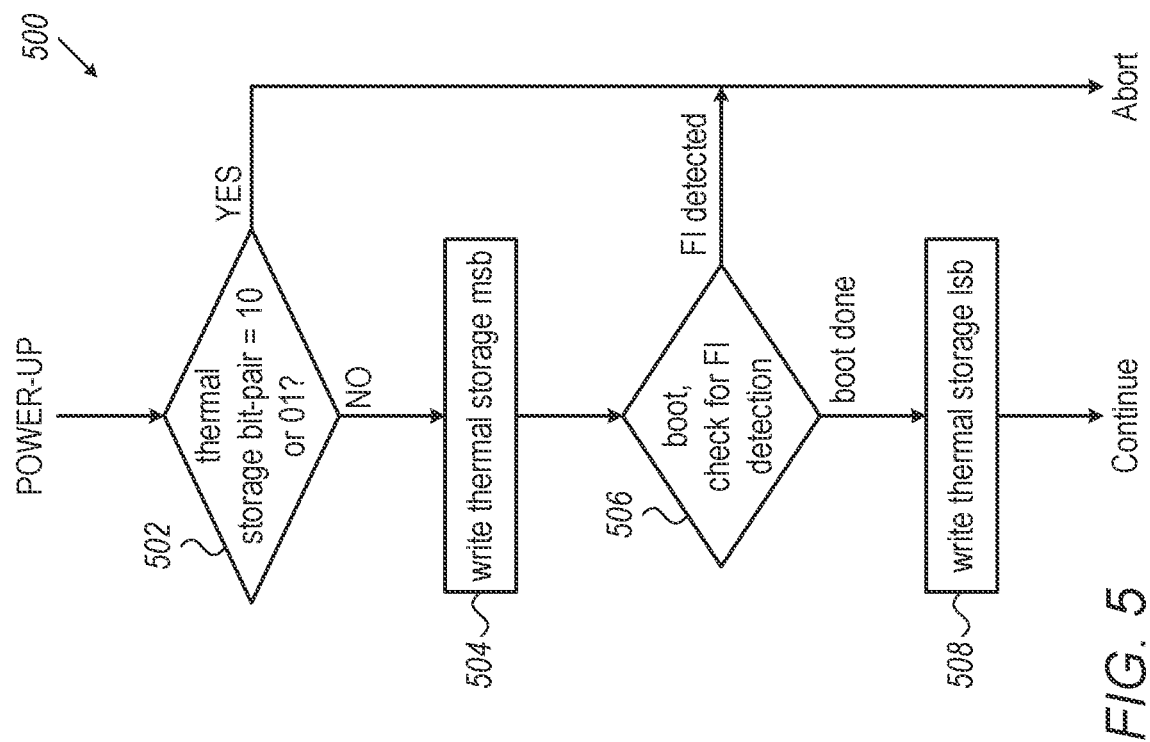
FIG. 5 is a flowchart that schematically illustrates a method for protecting the boot period of a secure processor IC against repetitive side channel attacks using a two-bit thermal memory, in accordance with an embodiment of the present invention.

FIG. 5 is a flowchart 500 that schematically illustrates a method for protecting the boot period of a secure processor IC against repetitive side channel attacks using a two-bit thermal memory, in accordance with an embodiment of the present invention. The flowchart is executed by SCC 106 (FIG. 1) and assumes a two-bit thermal memory that comprises a high order bit and a low order bit.

Upon power-up (or power-up reset), the flowchart enters a Check-01-or-10 operation 502, wherein the SCC checks if the thermal memory is in one of 10 or 01 states. If so, the flowchart ends and the boot aborts (the attacker could restart the operation but will have to wait for the set thermal memory bit to clear, or to cool). If, in operation 502, the thermal memory is not in a 01 or a 10 state, the SCC enters a Write-MSB operation 504, and writes the high order bit of the thermal memory.

Next, the SCC enters a Boot operation 506, wherein the processor boots. Fault injection detection is active throughout the boot operation and, if the fault injection detection circuit 104 (FIG. 1) detects a fault injection, the flow chart will exit, and program execution will abort.

If Boot completes normally (and, hence, no faut injections are detected throughout the Boot), the SCC enters a Write-LSB operation 508, and writes the low order bit of the thermal memory; program execution will then continue, past the Boot.

In embodiments, each pair of two thermal memory bits described above is differential (e.g., thermal memory 200, FIG. 2); thus, preheating of the entire secure IC will not be interpreted as a 11 state.

Thus, the status of the thermal memory upon power-up will indicate the security status of the secure IC:
- {11}-no fault injections were detected in the last operation of the secure IC; boot (with no fault injection detection) is allowed.
- {00}-Last secure IC boot was done tens of seconds ago; boot (with no fault injection detection) is allowed.
- {10}-a fault injection has been detected in the last boot. Boot is not allowed.
- {01}-Abnormal status (could occur, for example, if the MSB erased over time but the LSB is still on)—boot is not allowed.

The methods illustrated in FIGS. 4, 5 and described above are cited by way of example. Other methods can be used in alternative embodiments. For example, in some embodiments flowchart 500 can be modified to protect a sensitive portion of the boot only, wherein the SCC writes the MSB of the thermal memory prior to entering the sensitive portion and writes the LSB upon exit. In some embodiments the thermal memory comprises a plurality of MSB-LSB bit-pairs, and the SCC cyclically uses the pairs. In an embodiment, a multi-bit thermal memory is used, to allow the SCC a more precise estimate of the Fault Injection frequency. In an embodiment, the SCC checks a single thermal memory bit (that the SCC writes responsively to an FI detection event) upon power-up, and, if set, delays the boot operation (to avoid frequent attacks with varying parameters), and also rewrites the thermal bit to extend its storage retention time.

The configurations of secure IC 100, thermal memory 200 and thermal memory 300, and the methods of flowcharts 400 and 500, illustrated in FIGS. 1 through 5 and described hereinabove are example configurations and methods that are shown purely for the sake of conceptual clarity. Any other suitable system configurations and methods can be used in alternative embodiments. The different elements of secure IC 100, including thermal memories 200 and 300, may be implemented in an integrated circuit, such as an application specific integrated circuit (ASIC) or a field-programmable gate-array (FPGA).

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:
1. An integrated circuit (IC), comprising:
   a thermal memory device comprising at least two thermal-storage bits, each thermal storage bit comprising a thermal storage device, a temperature measurement device, and a heating device configured to heat the thermal storage device in response to write operations;

a fault injection (FI) detector, configured to detect attempts to inject faults into the IC; and a security control circuit, configured to:

perform a write operation to the thermal memory device in response to an attempt detected by the FI detector;

identify a sequence of the attempts that meets a density criterion, by reading the thermal memory device and detecting that at least a preset number of the thermal storage bits have been written; and initiate a responsive action upon identifying the sequence.

2. The IC according to claim 1, wherein the thermal storage zone comprises one or more reference thermal storage bits that are not written.

3. The IC according to claim 1, wherein the temperature measurement device comprises a P-N diode.

4. The IC according to claim 1, wherein the thermal storage device comprises a thermally isolated metal layer.

5. The IC according to claim 1, wherein the security control circuit is configured to sequentially: (i) further to a power-up sequence, check for a failed-boot attempt indication in which a first thermal storage bit has been written and a second thermal storage bit has not been written; (ii) responsively to detecting the failed-boot attempt indication, abort the boot; (iii) write to the first thermal storage bit; and (iv) responsively to a successful boot sequence, write to the second thermal storage bit.

6. The IC according to claim 1, wherein the security control circuit is configured to identify the sequence of the attempts regardless of a reset event occurring in the IC during the sequence.

7. A method for securing an integrated circuit (IC), the method comprising:

detecting attempts to inject faults into the IC;

in response to detecting an attempt to inject a fault, performing a write operation to a thermal memory device, which comprises at least two thermal-storage bits, each thermal storage bit comprising a thermal storage device, a temperature measurement device and a heating device configured to heat the thermal storage device in response to write operations;

identifying a sequence of the attempts that meets a density criterion, by reading the thermal memory device and detecting that at least a preset number of the thermal storage bits have been written; and initiating a responsive action upon identifying the sequence.

8. The method according to claim 7, wherein the thermal storage zone comprises one or more reference thermal storage bits that are not written.

9. The method according to claim 7, wherein the temperature measurement device comprises a P-N diode.

10. The method according to claim 7, wherein the thermal storage device comprises a thermally isolated metal layer.

11. The method according to claim 7, further comprising, sequentially: (i) further to a power-up sequence, checking for a failed-boot attempt indication in which a first thermal storage bit has been written and a second thermal storage bit has not been written; (ii) responsively to detecting the failed-boot attempt indication, aborting the boot; (iii) writing to the first thermal storage bit; and (iv) responsively to a successful boot sequence, writing to the second thermal storage bit.

12. The method according to claim 7, wherein identifying the sequence of the attempts is performed regardless of a reset event occurring in the IC during the sequence.

* * * * *